United States Patent
Chang

(10) Patent No.: US 7,804,492 B2
(45) Date of Patent: Sep. 28, 2010

(54) PORTABLE COMMUNICATIONS DEVICE WITH IMAGE PROJECTING CAPABILITY AND CONTROL METHOD THEREOF

(75) Inventor: Yuan-Pin Chang, Taipei (TW)

(73) Assignee: Compal Communications, Inc., Neihu, Taipei (TW)

( * ) Notice: Subject to any disclaimer, the term of this patent is extended or adjusted under 35 U.S.C. 154(b) by 807 days.

(21) Appl. No.: 11/800,373

(22) Filed: May 3, 2007

(65) Prior Publication Data
US 2007/0265717 A1  Nov. 15, 2007

(30) Foreign Application Priority Data
May 10, 2006 (TW) .............................. 95116560 A

(51) Int. Cl.
*G06F 3/041* (2006.01)
(52) U.S. Cl. ..................... 345/173; 345/156; 345/169
(58) Field of Classification Search ......... 345/156–173; 455/556.1, 575.1; 702/141; 353/72, 79
See application file for complete search history.

(56) References Cited

U.S. PATENT DOCUMENTS

| | | | | |
|---|---|---|---|---|
| 6,806,850 | B2 * | 10/2004 | Chen ............................. 345/7 |
| 7,016,711 | B2 * | 3/2006 | Kurakane ................ 455/575.1 |
| 7,187,343 | B2 * | 3/2007 | Pate ............................ 345/1.2 |
| 2004/0140982 | A1 * | 7/2004 | Pate ............................ 345/600 |
| 2005/0253776 | A1 * | 11/2005 | Lee et al. ...................... 345/1.3 |
| 2006/0131415 | A1 * | 6/2006 | Irons ........................... 235/454 |
| 2007/0063979 | A1 * | 3/2007 | Tran ............................. 345/169 |
| 2007/0064199 | A1 * | 3/2007 | Schindler et al. .............. 353/30 |
| 2007/0159453 | A1 * | 7/2007 | Inoue .......................... 345/156 |
| 2007/0282564 | A1 * | 12/2007 | Sprague et al. ............. 702/141 |
| 2008/0018591 | A1 * | 1/2008 | Pittel et al. ................... 345/156 |
| 2008/0048979 | A1 * | 2/2008 | Ruttenberg ................. 345/158 |
| 2008/0058009 | A1 * | 3/2008 | Ko et al. ................... 455/556.1 |

* cited by examiner

*Primary Examiner*—Nitin Patel
(74) *Attorney, Agent, or Firm*—Winston Hsu; Scott Margo; Min-Lee Teng

(57) ABSTRACT

A method of controlling a portable communications device with an image projecting capability includes: controlling an image projecting unit to project an output screen of an application program, and controlling a touch control display unit to display an operation interface set up according to characteristics of the application program; and in response to actuation of the operation interface, controlling the image projecting unit such that the output screen projected thereby is a result of interaction between the operation interface and the application program.

16 Claims, 5 Drawing Sheets

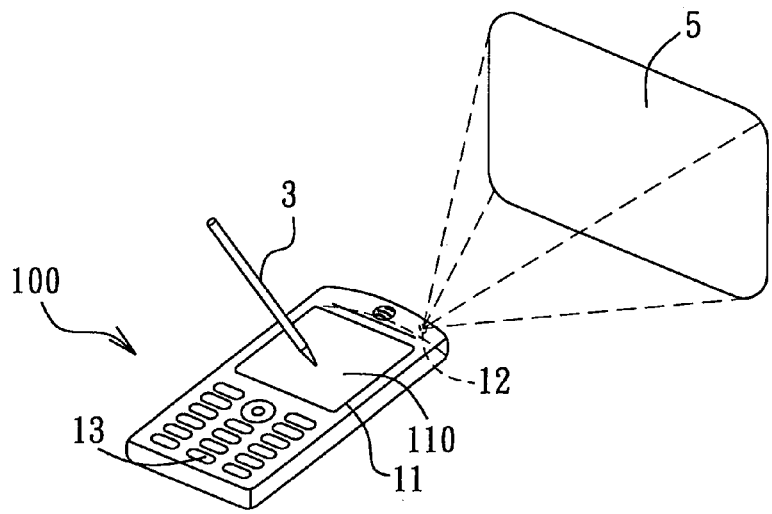
F I G. 1
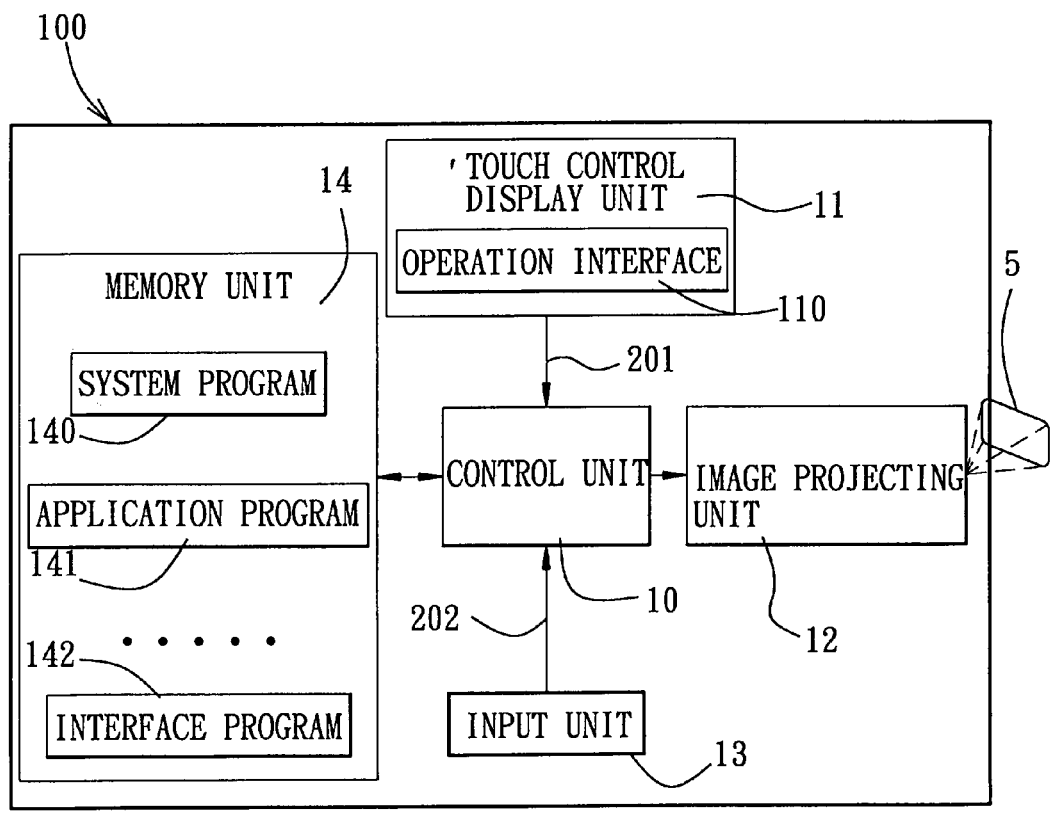
F I G. 2

PORTABLE COMMUNICATIONS DEVICE WITH IMAGE PROJECTING CAPABILITY AND CONTROL METHOD THEREOF

CROSS-REFERENCE TO RELATED APPLICATION

This application claims priority of Taiwanese application no. 095116560, filed on May 10, 2006.

BACKGROUND OF THE INVENTION

1. Field of the Invention

The invention relates to a portable communications device, more particularly to a portable communications device that has an image projecting capability and that has different operation interfaces corresponding to different application programs, as well as to a control method thereof.

2. Description of the Related Art

A conventional portable communications device usually includes a display screen and an input device with a plurality of keys. The keys are designed in a fixed format, and the definitions of the keys are predetermined by the system and cannot be changed, which results in lack of flexibility.

On the other hand, when an image projector is used together with a computer to make a presentation, a remote controller or a keyboard of the computer is used to control screen content, such as selection of a file in the computer, jumping to another page, etc. The projected screen is simply an enlargement of the image shown on a computer display.

If an image projecting capability is to be added into a portable communications device (such as a mobile phone or a personal digital assistant), a critical issue arises: Control of projected screens when making a presentation or those associated with other application programs is oftentimes very complicated and exceeds definitions that can be assigned to keys of the portable communications device. This is because the number, layout and definitions of keys are restricted by the size of the portable communications device.

SUMMARY OF THE INVENTION

One object of the present invention is to provide a method of controlling a portable communications device with an image projecting capability to generate operation interfaces corresponding to different application programs.

According to one aspect of the present invention, there is provided a method of controlling a portable communications device with an image projecting capability. The portable communications device includes an image projecting unit and a touch control display unit. The method comprises the steps of:

controlling the image projecting unit to project an output screen of an application program, and controlling the touch control display unit to display an operation interface set up according to characteristics of the application program; and in response to actuation of the operation interface, controlling the image projecting unit such that the output screen projected thereby is a result of interaction between the operation interface and the application program.

Another object of the present invention is to provide a method of controlling a portable communications device with an image projecting capability to operate in different modes.

According to another aspect of the present invention, there is provided a method of controlling a portable communications device with an image projecting capability. The portable communications device includes an image projecting unit and a touch control display unit. The method comprises the steps of:

configuring the portable communications device to operate in one of an image projecting mode and an interactive mode;

when the portable communications device is operated in the image projecting mode, controlling the image projecting unit to project an output screen of an application program, and controlling the touch control display unit to display the output screen projected by the image projecting unit; and when the portable communications device is operated in the interactive mode, controlling the touch control display unit to display an operation interface set up according to characteristics of the application program, and, in response to actuation of the operation interface, controlling the image projecting unit such that the output screen projected thereby is a result of interaction between the operation interface and the application program.

A further object of the present invention is to provide a portable communications device that has an image projecting capability and that can generate operation interfaces corresponding to different application programs.

According to yet another aspect of the present invention, there is provided a portable communications device that has an image projecting capability and that comprises a control unit, a memory unit, an image projecting unit, and a touch control display unit. The memory unit is coupled to the control unit for storing an application program and an interface program. The image projecting unit is coupled to and controlled by the control unit for projecting an output screen of the application program when the control unit executes the application program. The touch control display unit is coupled to and controlled by the control unit to display an operation interface set up according to characteristics of the application program when the control unit executes the interface program. The control unit is responsive to actuation of the operation interface so as to control the image projecting unit such that the output screen projected thereby is a result of interaction between the operation interface and the application program.

This invention enables operation interfaces corresponding to different application programs to be displayed on the touch control display unit such that the user can view and operate the operation interface directly to control the output screen projected by the image projecting unit. As a result, this invention is no longer restricted by the design of keys of the input unit, is convenient to operate, and can expand the range of control of the portable communications device.

BRIEF DESCRIPTION OF THE DRAWINGS

Other features and advantages of the present invention will be come apparent in the following detailed description of the preferred embodiment with reference to the accompanying drawings, of which:

FIG. 1 illustrates the preferred embodiment of a portable communications device with an image projecting capability according to the present invention;

FIG. 2 is a system block diagram of the preferred embodiment;

DETAILED DESCRIPTION OF THE PREFERRED EMBODIMENT

Figure 3:
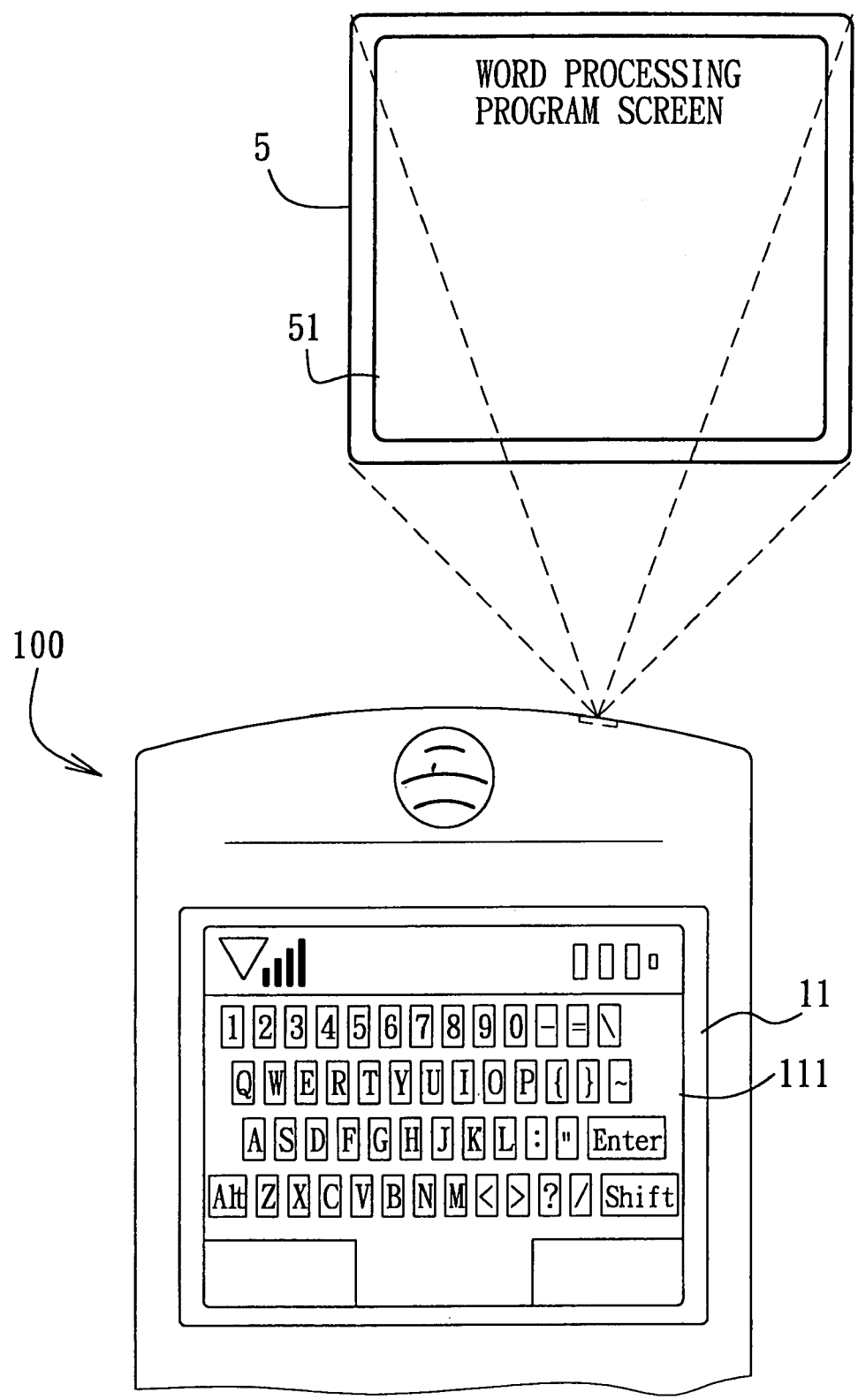
FIG. 3 is a schematic diagram to illustrate the preferred embodiment when used in a word processing application.

Referring to FIGS. 1 and 2, the preferred embodiment of a portable communications device 100 with an image projecting capability according to the present invention comprises a control unit 10, a touch control display unit 11 coupled to and controlled by the control unit 10, an image projecting unit 12 coupled to and controlled by the control unit 10, an input unit 13 coupled to the control unit 10, and a memory unit 14 coupled to the control unit 10. The portable communications device 100 can be a smart phone or a personal digital assistant (PDA) with communications capability.

The control unit 10 is used for controlling and coordinating operations of the various components of the portable communications device 100. The touch control display unit 11 is capable of displaying images, and can be actuated via an object 3, such as a pen, to generate a touch control signal 201 for the control unit 10. The input unit 13 is a keypad in this embodiment, and can be actuated to generate a keypad signal 202 for the control unit 10. The control unit 10 controls the image projecting unit 12 to project an output screen 5 in response to the touch control signal 201 or the keypad signal 202.

The memory unit 14 is coupled to the control unit 10 for storing a system program 140, an application program 141 and an interface program 142, which are to be executed by the control unit 10. The system program 140 is an operating system of the portable communications device 100, provides screen content of a "general operation mode," and further provides screen content of an "initialization mode" for function configuration of the image projecting unit 12 to be shown on the touch control display unit 11.

The application program 141 is one of a word processing program, a multimedia player program, and a graphics processing program. The interface program 142 is for generating an interactive operation interface 110 set up according to characteristics of the application program 141 (e.g., a word processing program, a multimedia player program or a graphics processing program). The operation interface 110 is to be displayed by the touch control display unit 11.

Moreover, the interface program 142 provides switching between an image projecting mode and an interactive mode. The switching may be realized through a software manner or a hardware manner. In the software manner, an option (not shown) on the touch control display unit 11 may be actuated by the user via the object 3 to generate the touch control signal 201 for the control unit 10, which responds by switching to the selected one of the image processing and interactive modes. In the hardware manner, a switch key (not shown) provided on the input unit 13 may be actuated by the user to generate the keypad signal 202 for the control unit 10, which responds by switching to the selected one of the image processing and interactive modes.

When the portable communications device 100 is operated in the image projecting mode, the image projecting unit 12 is controlled by the control unit 10 to project an output screen 5 of the application program 141, and the touch control display unit 11 is controlled by the control unit 10 to display the output screen 5 projected by the image projecting unit 12. Neither the output screen 5 nor the touch control display unit 11 shows the operation interface 110 at this time.

On the other hand, when the portable communications device 100 is operated in the interactive mode, while the image projecting unit 12 projects the output screen 5, the touch control display unit 11 is controlled by the control unit 10 to display the operation interface 110 set up according to characteristics of the application program 141. Further, in response to actuation of the operation interface 110, the image projecting unit 12 is controlled by the control unit 10 such that the output screen 5 projected thereby is a result (i.e., the application program screen) of interaction between the operation interface 110 and the application program 141.

Referring to FIGS. 2 and 3, when the application program 141 executed by the control unit 10 is a word processing program, and when the portable communications device 100 is operated in the interactive mode, the output screen 51 projected by the image projecting unit 12 is a word processing program screen, and the operation interface 110 displayed by the touch control display unit 11 is a keyboard interface 111 set up according to characteristics of the word processing program. The output screen 51 projected by the image projecting unit 12 is a result of interaction between the keyboard interface 111 and the word processing program, e.g., a character inputted via actuation of the keyboard interface 111 is presented in the output screen 51 projected by the image projecting unit 12.

Figure 4:
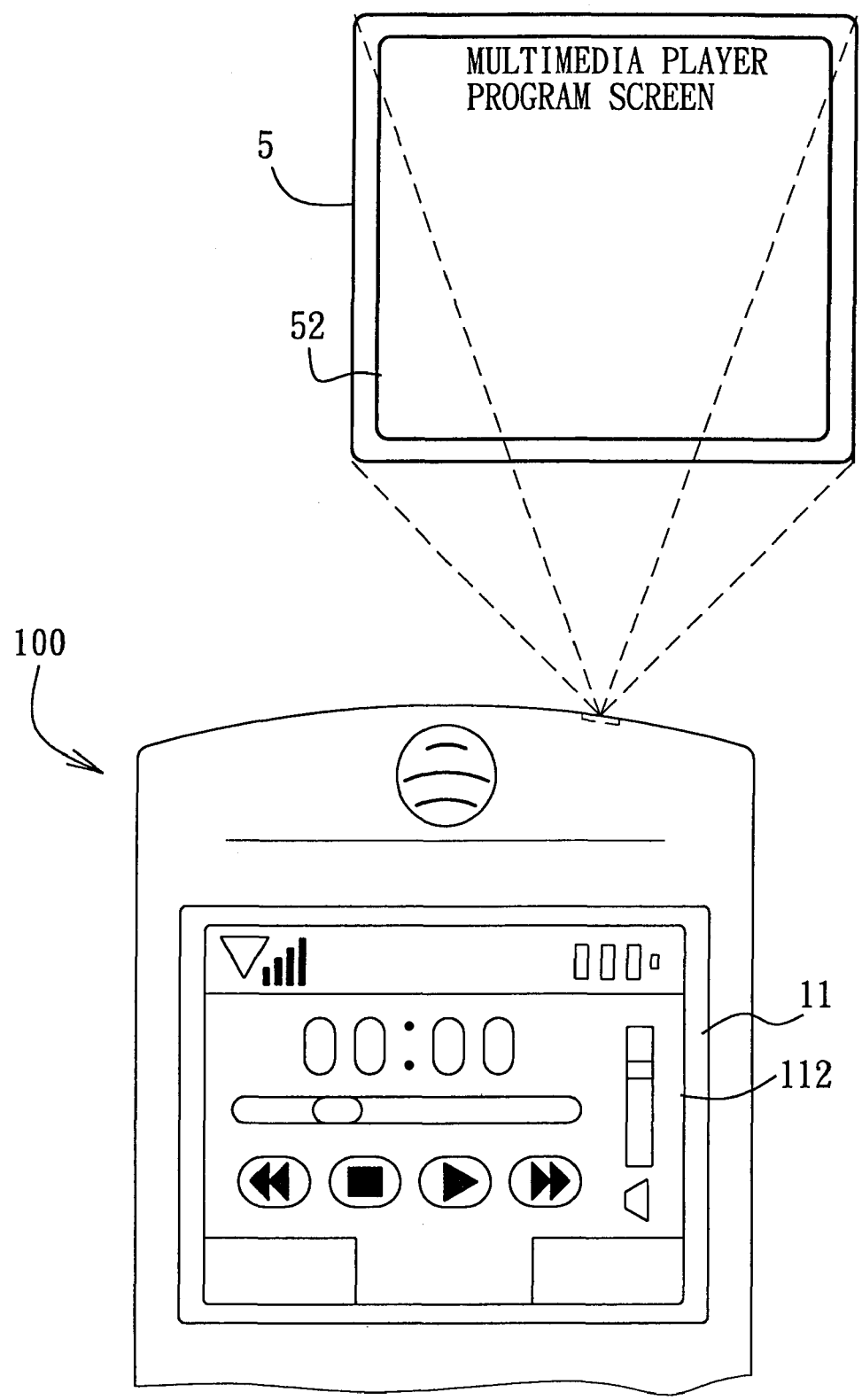
FIG. 4 is a schematic diagram to illustrate the preferred embodiment when used in a multimedia player application.

Referring to FIGS. 2 and 4, when the application program 141 executed by the control unit 10 is a multimedia player program, and when the portable communications device 100 is operated in the interactive mode, the output screen 52 projected by the image projecting unit 12 is a multimedia player program screen, and the touch control display unit 11 displays a multimedia processing interface 112 set up according to characteristics of the multimedia player program. The output screen 52 projected by the image projecting unit 12 is a result of interaction between the multimedia processing interface 112 and the multimedia player program, e.g., a result associated with execution of one of play, pause, fast forward and rewind options selected via actuation of the multimedia processing interface 112.

Figure 5:
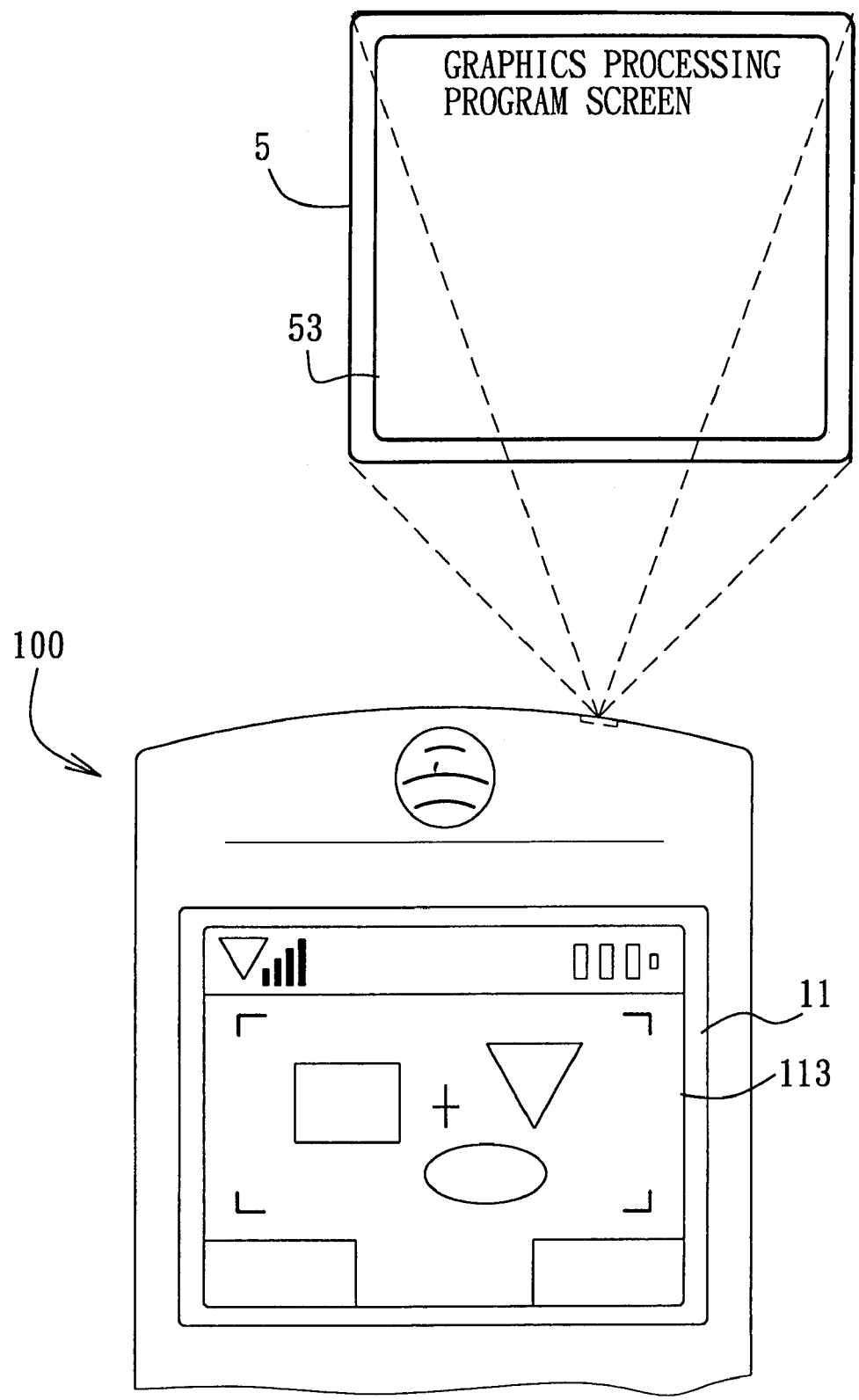
FIG. 5 is a schematic diagram to illustrate the preferred embodiment when used in a graphics processing application.

Referring to FIGS. 2 and 5, when the application program 141 executed by the control unit 10 is a graphics processing program (i.e., a digitizer tablet program), and when the portable communications device 100 is operated in the interactive mode, the output screen 53 projected by the image projecting unit 12 is a graphics processing program screen (i.e., a digitizer tablet screen), and the touch control display unit 11 displays a graphics processing interface 113 set up according to characteristics of the graphics processing program. The output screen 53 projected by the image projecting unit 12 is a result of interaction between the graphics processing interface 113 and the graphics processing program, e.g., one of a pen trace, a mouse cursor, and a coordinate point is presented in the output screen 53 projected by the image projecting unit 12 in response to actuation of the graphics processing interface 113.

Figure 6:
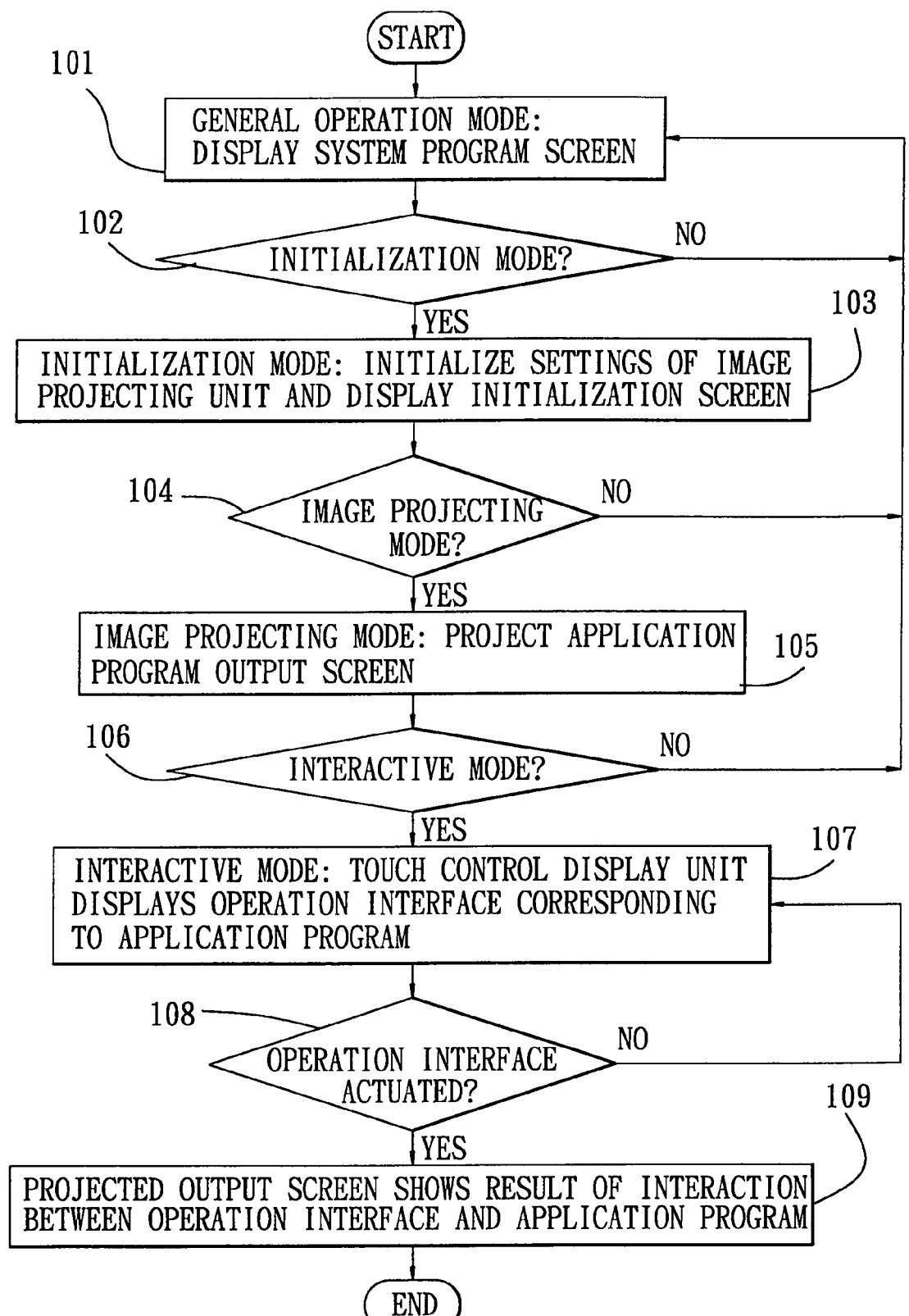
FIG. 6 is a flowchart of the preferred embodiment of a method of controlling a portable communications device with an image projecting capability according to the present invention.

Referring to FIGS. 2 and 6, the preferred embodiment of a method of controlling the portable communications device 100 according to this invention comprises the following steps:

In step 101, the portable communications device 100 is operated in the general operation mode for displaying a screen of the system program 140 when the device 100 is turned on. In step 102, it is determined whether the portable communications device 100 is to be operated in the initialization mode. In the negative, the flow goes back to step 101. Otherwise, the flow goes to step 103. In step 103, settings of the image projecting unit 12 are initialized through the system program 140, and an initialization screen is displayed. Then, in step 104, it is determined whether the portable communications device 100 is to be operated in the image projecting mode. In the negative, the flow goes back to step 101. Otherwise, the flow goes to step 105.

In step 105, the image projecting unit 12 is controlled by the control unit 10 to project the output screen 5 of the application program 141 executed by the control unit 10. In step 106, it is determined whether the portable communications device 100 is to be operated in the interactive mode. In the negative, the flow goes back to step 101. Otherwise, the flow goes to step 107.

In step 107, the touch control display unit 11 is controlled by the control unit 10 to display the operation interface 110 set up according to characteristics of the application program 141 executed by the control unit 10. Then, in step 108, it is determined whether the operation interface 110 is actuated. In the negative, the flow goes back to step 107. Otherwise, in step 109, the image projecting unit 12 is controlled by the control unit 10 to project the output screen 5 that is a result of interaction between the operation interface 110 and the application program 141.

In sum, this invention enables operation interfaces 110 corresponding to different application programs 141 to be displayed on the touch control display unit 11 such that the user can view and operate the operation interface 110 directly to control the output screen 5 projected by the image projecting unit 12. As a result, this invention is no longer restricted by the design of keys of the input unit 13, is convenient to operate, and can expand the range of control of the portable communications device 100.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of controlling a portable communications device with an image projecting capability, the portable communications device including an image projecting unit and a touch control display unit, said method comprising the steps of:
   a) controlling the image projecting unit to project an output screen of an application program, and controlling the touch control display unit to display an operation interface set up according to characteristics of the application program; and
   b) in response to actuation of the operation interface, controlling the image projecting unit such that the output screen projected thereby is a result of interaction between the operation interface and the application program.

2. The method as claimed in claim 1, wherein:
   in step a), the application program is a word processing program, the operation interface is a keyboard interface for the word processing program, and the output screen projected by the image projecting unit is a word processing program screen, and
   in step b), a character inputted via actuation of the keyboard interface is presented in the output screen projected by the image projecting unit.

3. The method as claimed in claim 1, wherein:
   in step a), the application program is a multimedia player program, the operation interface is a multimedia processing interface for the multimedia player program, and the output screen projected by the image projecting unit is a multimedia player program screen, and
   in step b), the output screen projected by the image projecting unit shows a result associated with execution of one of play, pause, fast forward and rewind options selected via actuation of the multimedia processing interface.

4. The method as claimed in claim 1, wherein:
   in step a), the application program is a graphics processing program, the operation interface is a graphics processing interface for the graphics processing program, and the output screen projected by the image processing unit is a graphics processing program screen, and
   in step b), one of a pen trace, a mouse cursor, and a coordinate point is presented in the output screen projected by the image projecting unit in response to actuation of the graphics processing interface.

5. A method of controlling a portable communications device with an image projecting capability, the portable communications device including an image projecting unit and a touch control display unit, said method comprising the steps of:
   a) configuring the portable communications device to operate in one of an image projecting mode and an interactive mode;
   b) when the portable communications device is operated in the image projecting mode, controlling the image projecting unit to project an output screen of an application program, and controlling the touch control display unit to display the output screen projected by the image projecting unit; and
   c) when the portable communications device is operated in the interactive mode, controlling the touch control display unit to display an operation interface set up according to characteristics of the application program, and, in response to actuation of the operation interface, controlling the image projecting unit such that the output screen projected thereby is a result of interaction between the operation interface and the application program.

6. The method as claimed in claim 5, wherein, in step a), the portable communications device is further configured to operate in an initialization mode; said method further comprising controlling the touch control display unit to display an initialization screen when the portable communications device is operated in the initialization mode.

7. The method as claimed in claim 5, wherein:
   in step c), the operation interface is a keyboard interface for a word processing program, and a character inputted via actuation of the keyboard interface is presented in the output screen projected by the image projecting unit.

8. The method as claimed in claim 5, wherein:
   in step c), the operation interface is a multimedia processing interface for a multimedia player program, and the output screen projected by the image projecting unit is a multimedia player program screen that shows a result associated with execution of one of play, pause, fast forward and rewind options selected via actuation of the multimedia processing interface.

9. The method as claimed in claim 5, wherein:
   in step c), the operation interface is a graphics processing interface for a graphics processing program, and one of a pen trace, a mouse cursor, and a coordinate point is presented in the output screen projected by the image projecting unit in response to actuation of the graphics processing interface.

10. The method as claimed in claim 5, wherein switching between the image projecting mode and the interactive mode is realized through actuation of an option shown on the touch control display unit.

11. The method as claimed in claim 5, wherein switching between the image projecting mode and the interactive mode is realized through actuation of a switch key of an input unit of the portable communications device.

12. A portable communications device with image projecting capability, comprising:
- a control unit;
- a memory unit coupled to said control unit for storing an application program and an interface program;
- an image projecting unit coupled to and controlled by said control unit for projecting an output screen of the application program when said control unit executes the application program; and
- a touch control display unit coupled to and controlled by said control unit to display an operation interface set up according to characteristics of the application program when said control unit executes the interface program;
- wherein said control unit is responsive to actuation of said operation interface so as to control said image projecting unit such that the output screen projected thereby is a result of interaction between said operation interface and the application program.

13. The portable communications device as claimed in claim 12, wherein said operation interface is a keyboard interface for a word processing program.

14. The portable communications device as claimed in claim 12, wherein said operation interface is a multimedia processing interface for a multimedia player program.

15. The portable communications device as claimed in claim 12, wherein said operation interface is a graphics processing interface for a graphics processing program.

16. The portable communications device as claimed in claim 12, wherein the interface program enables operation of said control unit in a selected one of an image projecting mode and an interactive mode, wherein, when said control unit is operated in the image projecting mode, said control unit controls said image projecting unit to project the output screen of the application program, and further controls said touch control display unit to display the output screen projected by said image projecting unit, and wherein, when said control unit is operated in the interactive mode, said control unit controls said touch control display unit to display said operation interface set up according to characteristics of the application program, and, in response to actuation of said operation interface, said control unit controls said image projecting unit such that the output screen projected thereby is the result of interaction between said operation interface and the application program.

\* \* \* \* \*